(12) United States Patent
Cantwell et al.

(10) Patent No.: US 12,063,909 B2
(45) Date of Patent: Aug. 20, 2024

(54) REMOVABLE CLIP FOR AN ANIMAL ENCLOSURE

(71) Applicant: Mid-West Metal Products Company, Inc., Muncie, IN (US)

(72) Inventors: Brad Cantwell, Muncie, IN (US); Mark E. Watson, Farmland, IN (US); Michael Eric Greene, Muncie, IN (US)

(73) Assignee: MID-WEST METAL PRODUCTS COMPANY, INC., Muncie, IN (US)

( * ) Notice: Subject to any disclaimer, the term of this patent is extended or adjusted under 35 U.S.C. 154(b) by 545 days.

(21) Appl. No.: 17/246,758

(22) Filed: May 3, 2021

(65) Prior Publication Data
US 2021/0337765 A1    Nov. 4, 2021

Related U.S. Application Data

(60) Provisional application No. 63/018,640, filed on May 1, 2020.

(51) Int. Cl.
*A01K 1/02* (2006.01)
*A01K 1/03* (2006.01)

(52) U.S. Cl.
CPC ............ *A01K 1/0245* (2013.01); *A01K 1/03* (2013.01)

(58) Field of Classification Search
CPC ........ A01K 1/034; A01K 1/032; A01K 1/031; A01K 1/03; A01K 1/0245; A01K 1/035
See application file for complete search history.

(56) References Cited

U.S. PATENT DOCUMENTS

| | | | | |
|---|---|---|---|---|
| 2,320,067 A | * | 5/1943 | Caughren | A01M 31/006 224/268 |
| 2,410,879 A | * | 11/1946 | Hegener | A01K 1/031 43/81.5 |
| 2,693,786 A | * | 11/1954 | Babros | A01K 31/10 248/240.4 |

(Continued)

FOREIGN PATENT DOCUMENTS

| | | |
|---|---|---|
| JP | 60-077447 U | 5/1985 |
| KR | 10-2064859 B1 | 1/2020 |

OTHER PUBLICATIONS

Korean Intellectual Property Office, International Searching Authority; International Search Report; Dated: Aug. 18, 2021; pp. 1-3.

(Continued)

*Primary Examiner* — Monica L Perry
(74) *Attorney, Agent, or Firm* — Taft Stettinius & Hollister LLP; Stephen F. Rost

(57) ABSTRACT

An animal enclosure includes a door, a door frame, and a plurality of members each formed by a plurality of interconnecting horizontal and vertical wires. The door is movably coupled to the door frame between an open position and a closed position, where in any position except for the closed position an opening formed in the door frame is at least partially exposed to provide access to the interior of the enclosure. A clip is removably coupled to any one of the plurality of members. The clip includes a body formed by a first member, a top member, a base member, a second member, and a finger portion. The finger portion extends downward from the top member to define a first opening between the finger portion, the top member, and the first member.

9 Claims, 4 Drawing Sheets

(56) References Cited

U.S. PATENT DOCUMENTS

| | | | |
|---|---|---|---|
| 2,813,508 A | 11/1957 | Hobbs | |
| 3,499,674 A * | 3/1970 | Burkholder | A01K 31/005 |
| | | | 292/87 |
| 3,707,949 A | 1/1973 | Lippi | |
| 3,789,800 A | 2/1974 | Steudler | |
| 4,709,658 A | 12/1987 | Hostetler | |
| 5,373,810 A * | 12/1994 | Martin | A01K 31/02 |
| | | | 119/459 |
| 5,626,098 A * | 5/1997 | Askins | A01K 1/033 |
| | | | 119/474 |
| D384,443 S * | 9/1997 | Olfert | D30/119 |
| 6,230,655 B1 * | 5/2001 | Cohen | A01K 31/02 |
| | | | 119/459 |
| 6,681,720 B1 * | 1/2004 | Skurdalsvold | A01K 1/034 |
| | | | 119/462 |
| 6,997,138 B1 * | 2/2006 | Simpson | A01K 1/033 |
| | | | 217/122 |
| 8,925,492 B2 | 1/2015 | Cantwell et al. | |
| 9,410,348 B1 * | 8/2016 | Flannery | E06B 11/02 |
| 10,047,555 B2 | 8/2018 | Link et al. | |
| 10,085,416 B2 | 10/2018 | Link et al. | |
| D867,676 S * | 11/2019 | Cantwell | D30/119 |
| 10,470,435 B2 | 11/2019 | Fleming | |
| 10,660,303 B2 * | 5/2020 | Volin | A01K 1/034 |
| D917,791 S * | 4/2021 | Cantwell | D30/119 |
| 2008/0264348 A1 * | 10/2008 | Gere | A01K 1/03 |
| | | | 119/479 |
| 2012/0186530 A1 * | 7/2012 | Cantwell | A01K 1/034 |
| | | | 119/474 |
| 2016/0192611 A1 | 7/2016 | Cantwell et al. | |
| 2021/0092939 A1 * | 4/2021 | Koechner | A01K 45/005 |
| 2021/0120778 A1 * | 4/2021 | Prehogan | A01K 1/0245 |
| 2021/0176954 A1 * | 6/2021 | Cantwell | A01K 1/033 |

OTHER PUBLICATIONS

Korean Intellectual Property Office, International Searching Authority; Written Opinion of the International Searching Authority; Dated: Aug. 18, 2021; pp. 1-5.

* cited by examiner

REMOVABLE CLIP FOR AN ANIMAL ENCLOSURE

This application claims the benefit of U.S. Provisional Application Ser. No. 63/018,640, filed May 1, 2020 and entitled "Removable Clip for an Animal Enclosure," the disclosure of which is incorporated by reference in its entirety.

FIELD OF THE DISCLOSURE

The present disclosure relates to a clip for an apparatus for containing animals, and in particular to a removable clip for a collapsible wire crate for containing an animal.

BACKGROUND

The use of animal cages is well known in the prior art. Many conventional cages have been developed over the years for housing animals of different sizes, and through the development of these cages flexibility and portability have become points of emphasis. Some conventional cages, for example, have been designed to collapse to a compact position for portability. Others have been designed of light weight and from durable materials. Conventional cages have been designed for ease of transporting an animal.

Most conventional cages include at least one door for providing access to the interior of the cage. An animal can enter or exit the cage through the opening when the door is opened, and the animal can be safely contained in the cage when the door is closed. Many conventional cages include a door that is attached to the cage via a hinge. This allows the door to be swung open and closed. A spring activated latch or the like have been incorporated into the design of the door to allow a user to open or lock the door.

Many of these conventional designs have limitations, however. For instance, the door that is hingedly attached to the cage can be swung open or closed too quickly and scratch or damage another object such as a wall or furniture. In addition, due to the hinged connection, the door cannot be partially opened, i.e., the door is either open or closed.

Other conventional cages have a limited volume. For example, a large conventional cage is ideally suited for a larger animal, whereas a smaller cage is ideally suited for a smaller animal. However, many conventional cages with a larger capacity may not be suitable for a smaller animal. Further, it is not possible to change or reduce the size of a larger cage to meet the needs of a smaller animal. In some instances, it may be desirable to use a single cage for housing two or more animals, and many conventional cages are not designed to separate the animals from one another.

SUMMARY

In a first embodiment of the present disclosure, an animal enclosure includes a plurality of members each formed by a plurality of interconnecting horizontal and vertical wires, the plurality of members defining an interior of the enclosure and including at least a top, a bottom, a front, a rear, a first side member and a second side member; a door frame formed in one of the front, rear, first side member and second side member, the door frame formed by a plurality of interconnecting horizontal and vertical wires; a door formed by a plurality of interconnecting horizontal and vertical wires, the door being movably coupled to the door frame between an open position and a closed position, where in any position except for the closed position an opening formed in the door frame is at least partially exposed to provide access to the interior of the enclosure; and a clip removably coupled to any one of the plurality of members, the clip comprising a body formed by a first member, a top member, a base member, a second member, and a finger portion; wherein, the finger portion extends downward from the top member to define a first opening between the finger portion, the top member, and the first member; wherein, when coupled to any one of the plurality of members, a first horizontal wire of the one of the plurality of members is disposed within the first opening and the first member is in contact with a second horizontal wire of the one of the plurality of members, where the first horizontal wire is spaced from the second horizontal wire.

In one example of this embodiment, the top member is at least partially parallel to the base member. In a second example, the first member is at least partially perpendicular to the top member and base member. In a third example, the finger portion is partially parallel with the first member. In a fourth example, the clip includes a second member of the body, the second member being coupled to the base member and spaced from the first member. In a fifth example, the second member is at least partially parallel to the first member.

In a sixth example, the second member extends upward to define a second opening between the first member, the base member, and the second member. In a seventh example, the second opening is larger than the first opening. In an eighth example, the second member has a greater length than the finger portion; the second member has a shorter length than the first portion. In a ninth example, when the any one of the plurality of members comprises the door frame, a horizontal wire of the door is disposable in the second opening of the clip to hold the door in a partially open position relative to the door frame.

In a tenth example, the clip may include an intermediate member coupled to the first member of the clip, the intermediate member including a second finger portion extending downward therefrom to define a third opening between the second finger portion, the intermediate member, and the first member. In a further example, when coupled to any one of the plurality of members, a third horizontal wire of the one of the plurality of members is disposed within the third opening.

In another embodiment of the present disclosure, a clip for being removably coupled to an animal enclosure includes a first member defined in a first plane; a second member defined in a second plane, the first plane being parallel to the second plane; a base member integrally coupled between the first member and the second member, the base member defined in a third plane which is perpendicular to the first and second planes; a top member integrally coupled to the first member, the top member being disposed in a fourth plane which is parallel to the third plane; and a finger portion integrally formed with the top member and extending downwardly in a direction parallel to the first and second members; wherein, a first opening is defined between the finger portion, the top member and the first member; wherein, a second opening is defined between the first member, the base member, and the second member; wherein, the second opening is larger than the first opening.

In one example of this embodiment, the clip may include an intermediate member integrally coupled to the first member, the intermediate member located between the top member and the base member. In a second example, the clip may include a second finger portion integrally coupled with the intermediate portion and spaced from the first member to form a third opening. In another example, the top member and intermediate member extend from the first member in a first direction and the base member extends from the first member in a second direction, where the first direction is opposite the second direction.

In a further embodiment of the present disclosure, a method for opening a door of an animal enclosure to a desired size opening includes providing the animal enclosure comprising a door, a door frame, and a plurality of members each formed by a plurality of interconnecting horizontal and vertical wires to define an interior of the enclosure; providing a clip comprising a body including at least a first member, a top member, a base member, a second member, and a finger portion; identifying a first horizontal wire of the door frame which corresponds to the desired size opening; coupling the clip to a second horizontal wire of the door frame such that the base member is disposed proximate to or above the first horizontal wire; locating the second horizontal wire in a first opening formed by the finger portion, the top member and the first member of the clip; moving the door from its closed position to a new position where a lowermost horizontal wire of the door is disposed relative to the door frame such that the desired size opening is formed; and positioning a horizontal wire of the door in a second opening of the clip formed by the second member, the base member and the first member such that the lowermost horizontal wire contacts the base member.

In one example of this embodiment, the coupling step comprises coupling the clip to the door frame at a location outside of the opening formed in the door frame. In another example, the method includes providing a second clip comprising a body including at least a first member, a top member, a base member, a second member, and a finger portion; coupling the second clip to a third horizontal wire of the door frame such that the base member of the second clip is disposed proximate to or above the first horizontal wire; locating the third horizontal wire in a first opening of the second clip formed by the finger portion, the top member and the first member of the second clip; and positioning another horizontal wire of the door in a second opening of the second clip formed by its second member, base member and first member.

In a further example, the method may include providing the clip with an intermediate member having a second finger portion which defines a third opening between the intermediate member, the second finger portion and the first member; and coupling a further horizontal wire of the door frame in the third opening of the clip, where the further horizontal wire is located below the second horizontal wire of the door frame.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The present disclosure relates to a collapsible wire crate, and a removable clip for use with the crate. The wire crate can be used for multiple purposes, one of which is to contain animals. The crate can be made of any size for accommodating an object of any size. In addition, the crate can be made of different materials including aluminium, plastic, and steel.

Figure 1:
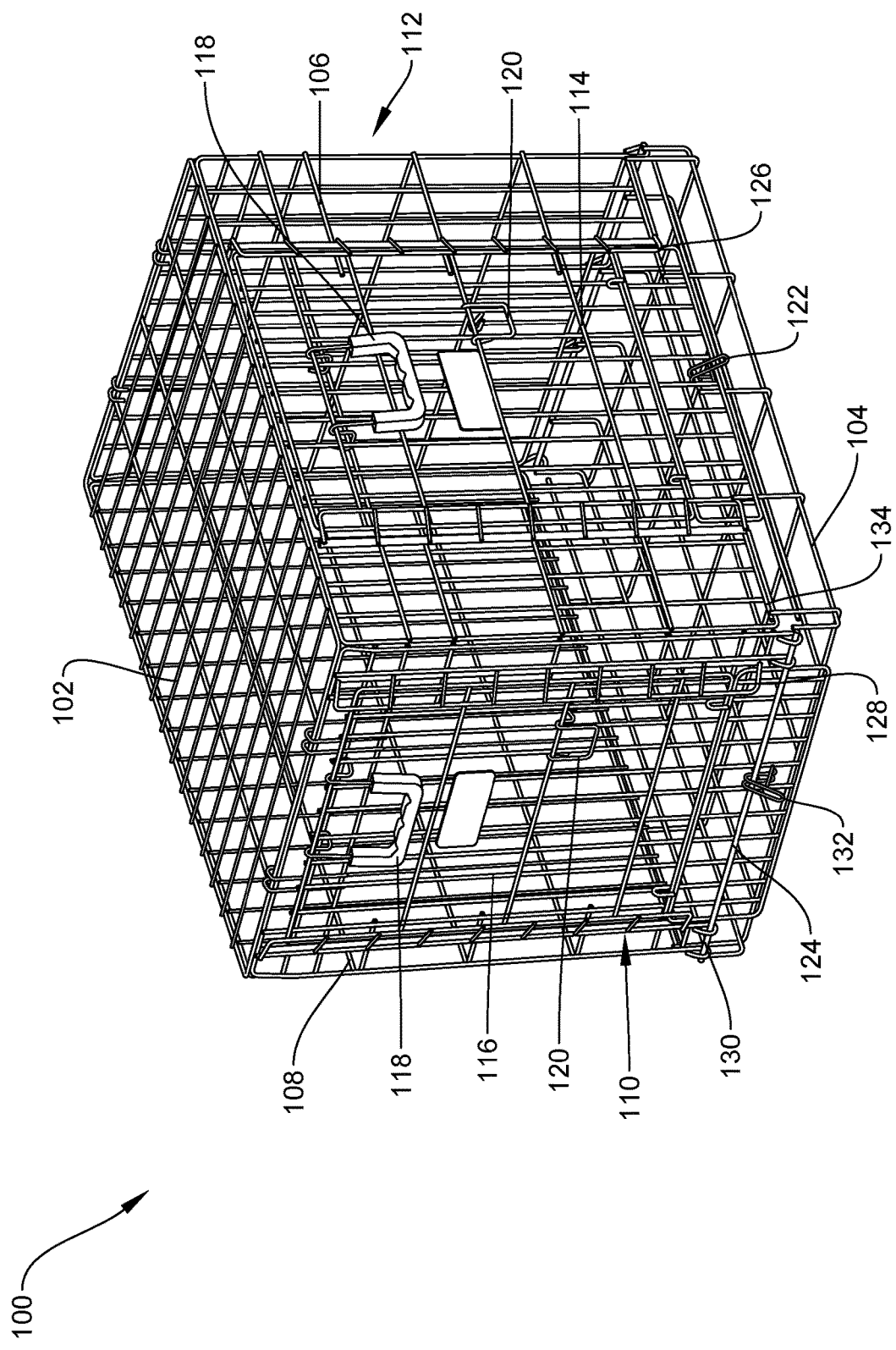
FIG. 1 is a perspective view of a wire crate.

Referring to FIG. 1, one embodiment of an animal enclosure in the form of a wire crate 100 of the present disclosure is shown. In this embodiment, a wire crate 100 for containing an animal includes a top panel 102, a bottom panel 104, a front panel 106, a back panel 108, and a pair of side panels oppositely disposed from one another. The pair of side panels includes a first side panel 110 and a second side panel 112. In this embodiment, the front panel 106 can include a door assembly 114. Likewise, the first side panel 110 can also include a door assembly 116. Each of the panels may be formed by a plurality of interconnecting horizontal and vertical wires.

The manner in which the door assemblies and panels form the wire crate 100 is capable of being folded into a collapsed position. Likewise, each panel can be removably coupled to the other panels. Alternatively, the top panel 102, bottom panel 104, front panel 106, and back panel 108 can form a continuous, collapsible structure in which each panel is affixed to the other panels. In the collapsed position, the top panel 102, front panel 106, back panel 108, and side panels 110, 112 can be folded on top of the bottom panel 104. The wire crate 100 can include a handle 118 disposed on the front panel 106 (or front door assembly 114) and/or first side panel 112.

The crate 100 can collapse into two orientation. In the first collapsed orientation, the side panels 110, 112 fold inwardly and then the top panel 102, front panel 106, and back panel 108 fold on top of the side panels. In this orientation, the handle 118 on the front panel 106 can be used for carrying the collapsed crate. In the second collapsed orientation, the top panel 102, front panel 106, and back panel 108 can be collapsed onto the bottom panel 104, and then the first side panel 110 and second side panel 112 can be folded on top of the collapsed panels. In this orientation, the handle 118 on the first side panel 110 can be used to carry the collapsed wire crate 100.

The front door assembly 114 and side door assembly 116 can be opened by pulling a latch 120 upward and raising the respective door. The latch 120, as further shown in FIG. 1, can include a pair of bent or curled wires. The curled wires are pivotally coupled to a horizontally-disposed wire of the door assembly. In this manner, the latch 120 can be pivoted upward about a pivot wire 200 (see FIG. 2) and then lifted to open the respective door assembly. As also shown, the latch 120 can include a stop member. The stop member can prevent the door from closing quickly and possibly injuring an animal that is passing through the opened door assembly.

The front door assembly 112 can include a pair of wire-defined tracks 126, each of which is disposed along opposite sides of the front door assembly 112. The front door can slide along the tracks 126 between an substantially open position and a substantially closed position. The tracks 126 of FIG. 1 are formed of the same wire material as the top panel 102, bottom panel 104, front panel 106, back panel 108, and side panels 110, 112. The wire used to form the tracks 126 can be welded or integrally formed to the front door assembly 114. Similarly, the side door assembly 114 can include a pair of wire-defined tracks 128. The tracks 128 disposed along the sides of the side door panel 112 can be welded or coupled to the side panel 112 in a similar manner as the front door tracks 126.

The front door assembly 114 can also include a front stopper 122 and the side door assembly 116 can include a side stopper 132. The front stopper 122 and side stopper 132 can be substantially identical and both function similarly. In FIG. 1, for example, the side stopper 132 can engage a horizontally disposed wire 130 of the side panel 110 or bottom panel 104 when the side door is closed. The side stopper 132 can align or maintain the side door in an upright position substantially perpendicular to the bottom panel 104. The side stopper 132 can further include a stop mechanism, which can be formed by a bent or straight wire. The stop mechanism protrudes towards the interior of the wire crate 100. As the side door is opened, the stop mechanism can engage a wire which is substantially parallel to wire 130, but which is disposed near the top panel 102. The stop mechanism can prevent the side door from being completely pulled out of engagement with the side tracks 128 and removed from the crate 100. In other embodiments, however, the stop mechanism may not be present, or may be present in a different form, to enable a user to remove the door from crate 100. The front stopper 122 can also include a stop mechanism in the form of a bent or straight wire. The front stopper 122 can engage wire 134 when the front door is in a closed position.

As also shown in FIG. 1, the first and second side panels 110, 112 or side door assembly 116 can include vertically disposed wires that form a pan stop 124. A pan therefore can be placed into the crate 100 and the pan stop 124 prevents the pan from sliding out of the crate 100. The front panel 106 or front door assembly 114 can also include wires that form a similar pan stop. Likewise, the back panel 108 can also form a pan stop.

Figure 2:
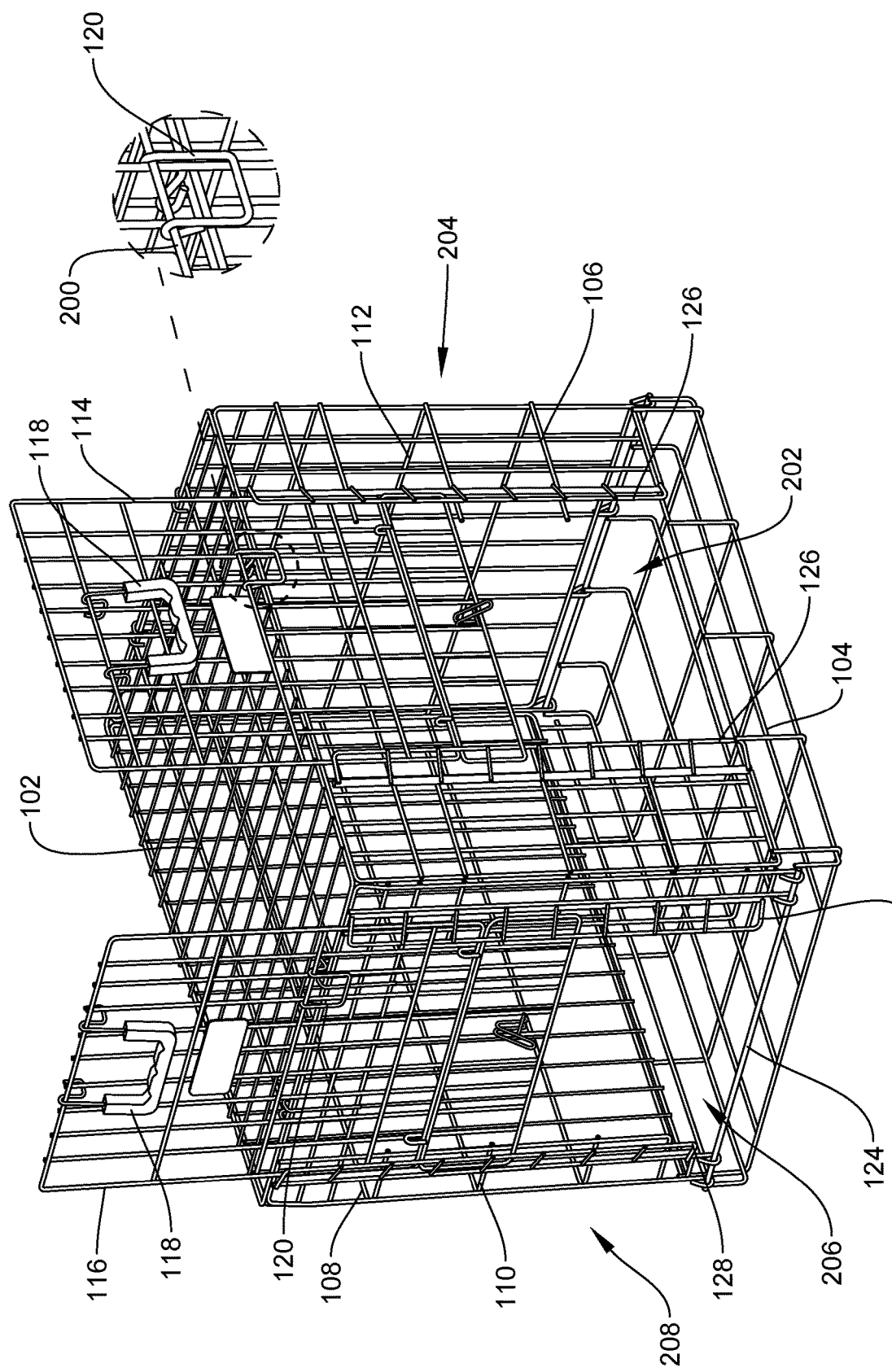
FIG. 2 is another perspective view of the wire crate of FIG. 1.

Turning to FIG. 2, the crate 100 is illustrated with each of its doors in partially open positions. Specifically, the first door assembly 114 is shown in a first partially open position 204. Here, the door assembly 114 may be slid upwards along the front tracks 126 such that a partial opening 202 is formed in the front of the crate. The latch 120 may engage the top wire of the crate 100 to at least partially hold the door assembly 114 in this position.

Likewise, on the first side panel 110, the second door assembly 116 is also shown in a first partially open position 208. The door assembly 116 is slid upwards along the second tracks 128 such that a partial opening 206 is formed in the first side panel 110. The latch assembly 120 on the second door assembly 116 may also be engaged with an uppermost horizontal wire of the first side panel 110 or an outer periphery wire of the top panel 102 to maintain the second door assembly 116 in this position 208.

In the positions illustrated in FIG. 2, a smaller animal may be allowed egress from an interior of the crate 100 through either opening 202, 204. However, neither opening 202, 204 is large enough for a bigger animal to enter or exit therethrough. A larger animal may need the openings to be more fully open without moving either door to their fully open position. Unfortunately, the wire crate 100 of FIGS. 1 and 2 is unable to achieve this orientation. Further, other crates without the latch 120 on each door assembly may be unable to achieve even a partially open position. Thus, there is a need for a mechanism to hold either door in a partially open position.

Figure 3:
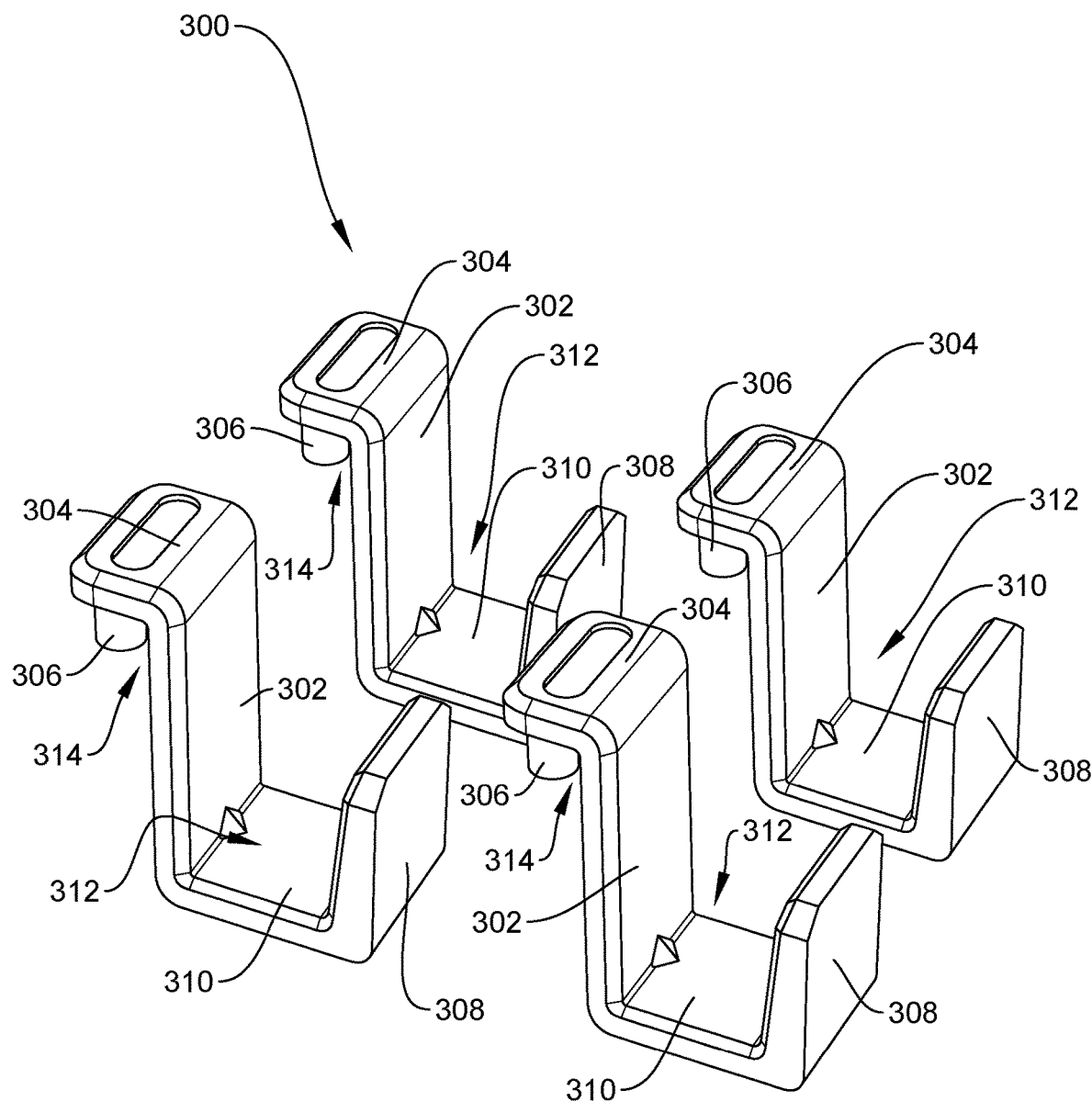
FIG. 3 is a perspective view of a plurality of clips.

Referring to FIG. 3, one embodiment of a removable clip 300 is illustrated. In particular, a plurality of the clips 300 are shown in FIG. 3. In each case, the clip 300 may be formed as a body having a first member 302 that is coupled between a top member 304 and a base member 310. The top member 304 and base member 310 may be substantially parallel to and spaced from one another, where the first member 302 may be substantially perpendicular to the top member 304 and base member 310. In one instance, the top member 304, first member 302 and base member 310 may be integrally formed with one another.

The clip 300 may also include a second member 308 as shown in FIG. 3. The second member 308 may be substantially parallel to the first member 302, and thus substantially perpendicular to the top member 304 and base member 310. The second member 308 may be integrally formed with the base member 310 in one embodiment. Alternatively, the different members may be coupled to one another via adhesive or other fastening mechanism.

The clip 300 may be formed of a plastic or resin in one embodiment. In another embodiment, the clip 300 may be formed of metal such as the wires of the wire crate 100. In a further embodiment, the clip 300 may be formed of any desired material for a crate.

The top member 304 of the clip 300 may include a finger 306 as shown in FIG. 1. The finger 306 may extend downwardly as shown, but spaced from the first member 302. The space between the finger 306 and first member 302 defines a first opening 314 for receiving a wire on a crate or other animal enclosure. This will be described in further detail below.

The clip 300 may also include a second opening 312 formed by the first member 302, base member 310, and second member 308. The second opening 312 may be wider or larger than the first opening 314. The second opening 312 may be such that a door assembly may be engaged within the second opening 312 to hold the door assembly in a desired position with respect to the door frame.

The clip 300 may be useful for the purpose of being removably coupled to an animal enclosure or crate 100. In FIGS. 1 and 2, for example, the removable clip 300 may be coupled to a horizontal wire of the front panel 106. To do so, the clip 300 may be located on the front panel 106 at its desired location. Once the location is identified, the horizontal wire of the front panel 106 may be disposed within the first opening 314 between the finger 306 and first member 302. The length of the first member 302 may be such that once the horizontal wire is positioned within the first opening 314, the first member 302 may rest against another horizontal wire spaced below the horizontal wire positioned within the first opening 314.

Once the clip 300 is coupled to the front panel 106, the first door assembly 114 may be moved upward along the tracks 126 to a desired position. At this position, a horizontal wire of the first door assembly 114 may be disposed within the second opening 312 of the clip 300. The second member 308 can prevent the door assembly 114 from disengaging from the second opening 312, and thus the clip 300 is able to hold the first door assembly 114 in any desired position relative to the front panel 106. As such, any desired opening 202 may be achieved with the use of the removable clip 300 in that the clip 300 may be coupled at any location on the front panel 106 to achieve the desired sized of the front door opening 202.

In some instances, it may be desirable to use two or more removable clips 300 in order to position the first door assembly 114 in a desired location relative to the front panel 106. Moreover, the same removable clips 300 may be used to couple to the first side panel 110 in order to hold the second door assembly 116 in a desired position. As a result, the desired size of the second door opening 206 may be achieved with the use of one or more clips 300.

Advantageously, the same one or more clips 300 may be used for any door on any crate or animal enclosure. If a user has two or more crates or enclosures, the same clips may be used on either. This universal aspect of the removable clips overcomes many of the disadvantages associated with conventional crates and enclosures where an owner of more than one pet can modify the size of a door opening. Further, the clips 300 may be used when allowing a smaller animal to pass through an opening, but want to limit the movability of a larger animal.

Figure 4:
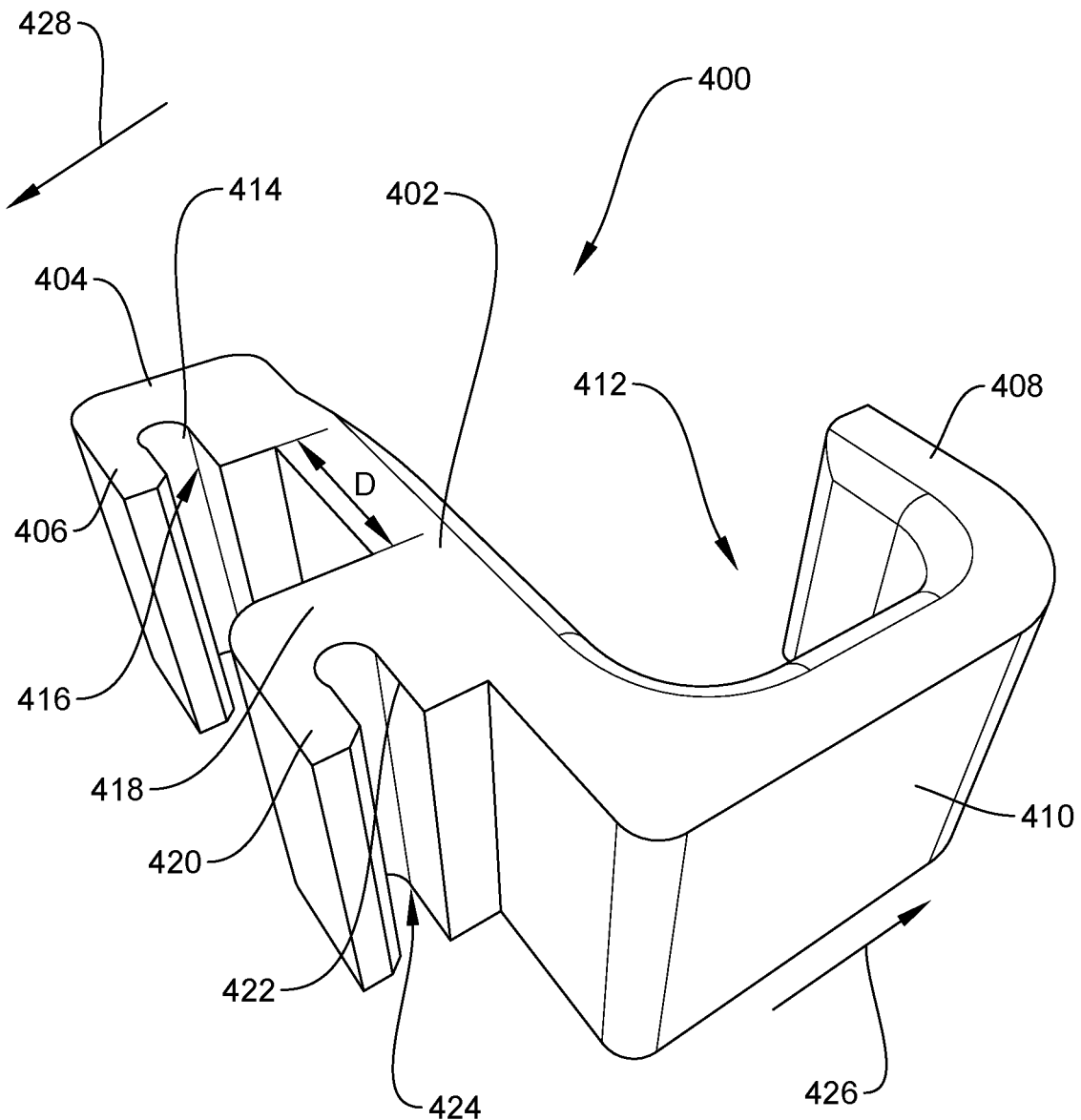
FIG. 4 is a perspective view of another clip.

In FIG. 4, another embodiment of a removable clip 400 is shown. Here, the clip 400 is similarly shaped to the removable clip 300 of FIG. 3, albeit with a few structural differences. Here, the clip 400 may include a first member 402, a top member 404, a second member 408 and a base member 410. The first member 402 may be coupled between the top member 404 and base member 410. Moreover, the first member 402 may be disposed substantially perpendicular to the top member 404 and base member 410. Thus, the top member 404 and base member 410 may be substantially parallel to but spaced from one another.

The second member 408 may be substantially parallel to but offset from the first member 402. In particular, the distance the second member 408 is offset from the first member 402 is defined by a length of the base member 410, as shown in FIG. 4. In one example, the first member 402, top member 404, second member 408 and base member 410 may be integrally formed with one another. Alternatively, the different members may be coupled to one another via adhesive or other fastening mechanism.

The clip 400 may be formed of a plastic or resin in one embodiment. In another embodiment, the clip 400 may be formed of metal such as the wires of the wire crate 100. In a further embodiment, the clip 400 may be formed of any desired material for a crate.

The removable clip 400 of FIG. 4 may also include a finger 406 coupled to the top member 404. The finger 406 may be oriented downward at approximately 90° relative to the top member 404. Further, the finger 406 may be spaced from the first member 402 but disposed substantially parallel thereto. Due to the spacing between the first member 402 and the finger 406, a first notch 414 may be formed therebetween. The first notch 414 in effect may form a first opening 416 for receiving a first horizontal wire on an animal enclosure or crate, as described further below.

Unlike the removable clip 300 of FIG. 3, the removable clip 400 of FIG. 4 may also include an intermediate member 418. The intermediate member 418 may be at least partially parallel to the top member 404, but spaced therefrom. Moreover, the intermediate member 418 may be located inbetween the top member 404 and the base member 410.

As shown in FIG. 4, the base member 410 protrudes in a first outward direction 426 from the first member 402. On the other hand, the top member 402 protrudes in a second outward direction 428 relative to the first member 402. The intermediate member 418 also may protrude in the second outward direction 428 relative to the first member 402, as shown in FIG. 4.

The intermediate member 418 may also include a second finger 420. The second member 420 may be structurally similar to the first finger 406 in that it too is spaced from the first member 402. The first finger 406 and the second finger 420 may be aligned in the same plane to allow the clip 400 to be coupled to a panel of an animal enclosure or crate, as described below.

In the manner shown in FIG. 4, the spacing between the second finger 420 and the first member 402 may form a second notch 422. The second notch 422 may form a second opening 424 capable of receiving a second horizontal wire of a panel.

The removable clip 400 of FIG. 4 may comprise similar utility as the clip of FIG. 3, and in particular, may be used for the purpose of being removably coupled to an animal enclosure or crate 100. In FIGS. 1 and 2, for example, the removable clip 400 may replace the latch 120 and/or be coupled to at least two horizontal wires of the front panel 106. To do so, the clip 400 may be located on the front panel 106 at its desired location. Once the location is identified, a first horizontal wire of the front panel 106 may be disposed within the first opening 416 between the first finger 406 and first member 402.

Once the first horizontal wire is coupled in the first opening 416, a second horizontal wire spaced from the first horizontal wire on the front panel 106 may be disposed within the second opening 424. The spacing between the first notch 414 and the second notch 422 may advantageously correspond with the desired spacing between horizontal wires of an animal enclosure or crate 100. In the event the clip 400 is used on an animal enclosure where the spacing between horizontal wires does not correspond with the spacing between the first and second notches, the clip 400 may still function properly when a horizontal wire is engaged with either the first or second opening (i.e., similar to the removable clip 300 of FIG. 3). In this latter case, the length of the first member 402 may be such that once the horizontal wire is positioned within the first opening 414, the first member 402 may rest against another horizontal wire spaced below the horizontal wire positioned within the first opening 414.

Once the clip 400 is coupled to the front panel 106, the first door assembly 114 may be moved upward along the tracks 126 to a desired position. At this position, a horizontal wire of the first door assembly 114 may be disposed within a third opening 412 of the clip 400. The third opening 412 may be formed by the spacing between the first member 402 and the second member 408. The horizontal wire of the door assembly 114 may rest on the base member 410 in the engaged position.

Once engaged, the second member 408 can prevent the door assembly 114 from disengaging from the second opening 412, and thus the clip 400 is able to hold the first door assembly 114 in any desired position relative to the front panel 106. As such, any desired opening 202 may be achieved with the use of the removable clip 400 in that the clip 400 may be coupled at any location on the front panel 106 to achieve the desired sized of the front door opening 202.

In some instances, it may be desirable to use two or more removable clips 400 in order to position the first door assembly 114 in a desired location relative to the front panel 106. Moreover, the same removable clips 400 may be used to couple to the first side panel 110 in order to hold the second door assembly 116 in a desired position. As a result, the desired size of the second door opening 206 may be achieved with the use of one or more clips 400.

In addition, the removable clip 400 of FIG. 4 may be more securely coupled to the front panel 106, first side panel 110, or any other side panel of an animal enclosure or crate due to it being coupled at two locations rather than one with the clip 300 of FIG. 3. This additional securement may reduce or prevent the clip from disengaging from the panel.

In other embodiments, the clip 300 of FIG. 3 may be used in combination with the clip 400 of FIG. 4. This may be particularly useful for crates where the spacing between horizontal wires does not correspond to the spacing between the first and second notches.

Advantageously, the same one or more clips 400 may be used for any door on any crate or animal enclosure. If a user has two or more crates or enclosures, the same clips may be used on either. This universal aspect of the removable clips overcomes many of the disadvantages associated with conventional crates and enclosures where an owner of more than one pet can modify the size of a door opening. Further, the clips 400 may be used when allowing a smaller animal to pass through an opening, but want to limit the movability of a larger animal.

In other embodiments, the clips may be used to couple two or more crates to one another. Doors may be removed from the crates such that the clips of the present disclosure may connect the two or more crates to form a larger enclosure capable of containing additional animals. To do so, for example, a horizontal wire of one enclosure may be disposed within the first opening 314 of one or more clips 300 and a horizontal wire of a second enclosure may be disposed within the second opening 312. The clip 300 may securely maintain the two enclosures in a coupled position such that if positioned such that the corresponding door frames are facing one another, an enclosed animal may traverse through the pair of openings between the two enclosures. The same may be the case with the use of one or more of the clips in FIG. 4.

In a further embodiment, the removable clip may be coupled to a horizontal wire and face the interior of the crate. A toy, snack, or other component may be coupled to the clip so that the enclosed animal may enjoy the item. This may be particularly the case with a stuffed toy that has a loop or hook that may couple to the clip and hang from any side of the crate.

While exemplary embodiments incorporating the principles of the present disclosure have been disclosed hereinabove, the present disclosure is not limited to the disclosed embodiments. Instead, this application is intended to cover any variations, uses, or adaptations of the present disclosure using its general principles. Further, this application is intended to cover such departures from the present disclosure as come within known or customary practice in the art to which this disclosure pertains and which fall within the limits of the appended claims.

The invention claimed is:

1. An animal enclosure, comprising:
   a plurality of members each formed by a plurality of interconnecting horizontal and vertical wires, the plurality of members defining an interior of the enclosure and including at least a top, a bottom, a front, a rear, a first side member and a second side member;
   a door frame formed in one of the front, rear, first side member and second side member, the door frame formed by a plurality of interconnecting horizontal and vertical wires;
   a door formed by a plurality of interconnecting horizontal and vertical wires, the door being movably coupled to the door frame between an open position and a closed position, where in any position except for the closed position an opening formed in the door frame is at least partially exposed to provide access to the interior of the enclosure; and
   a removable clip removably coupled to any one of the plurality of members, the clip comprising a body formed by a first member, a top member, a base member, a second member substantially parallel to the first member, and a finger portion;
   wherein, the finger portion extends downward from the top member to define a first opening between the finger portion, the top member, and the first member;
   wherein, when coupled to any one of the plurality of members, a first horizontal wire of the one of the plurality of members is disposed within the first opening and the first member is in contact with a second horizontal wire of the one of the plurality of members, where the first horizontal wire is spaced from the second horizontal wire; and,
   wherein the second member of the body is coupled to the base member and is spaced from the first member to define a second opening that is larger than the first opening.

2. The animal enclosure of claim 1, wherein the top member is substantially parallel to the base member.

3. The animal enclosure of claim 1, wherein the first member is substantially perpendicular to the top member and base member.

4. The animal enclosure of claim 1, wherein the finger portion is substantially parallel with the first member.

5. The animal enclosure of claim 1, wherein the second member of the body is substantially perpendicular to the top member and to the base member.

6. The animal enclosure of claim 5, wherein the second member extends upward to define the second opening between the first member, the base member, and the second member.

7. The animal enclosure of claim 6, wherein:
   the second member has a greater length than the finger portion;
   the second member has a shorter length than the first member.

8. The animal enclosure of claim 6, wherein, when the any one of the plurality of members comprises the door frame, a horizontal wire of the door is disposable in the second opening of the clip to hold the door in a partially open position relative to the door frame.

9. The animal enclosure of claim 1, wherein the second opening is wider than the first opening.

* * * * *